(No Model.)
G. LOPPENS & H. DESWARTE.
PROCESS OF RETTING OR STEEPING FLAX OR HEMP.
No. 576,867.                                Patented Feb. 9, 1897.
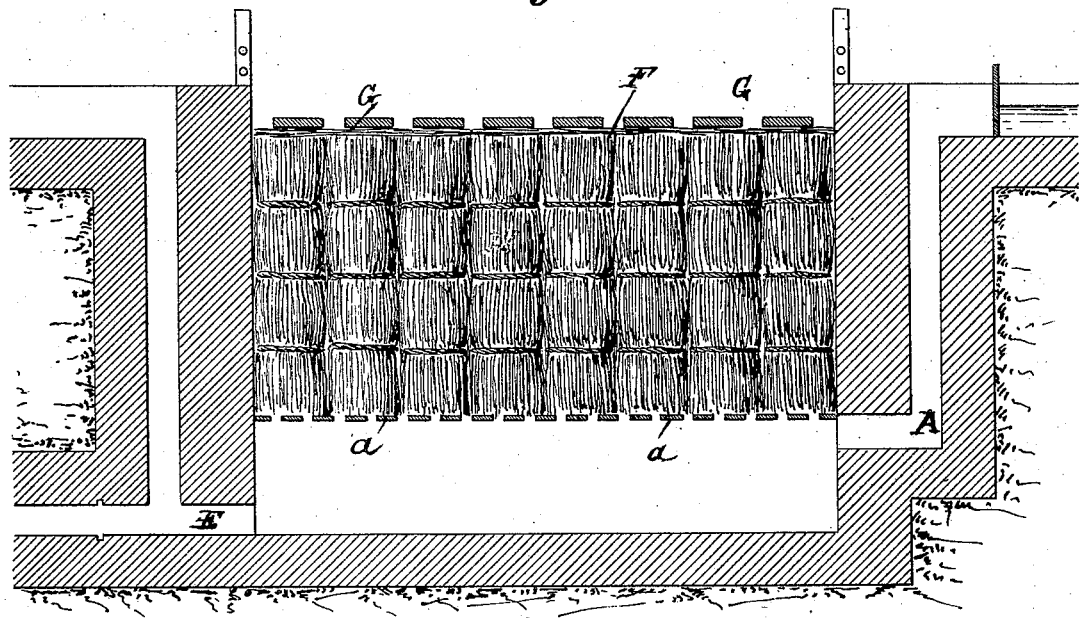
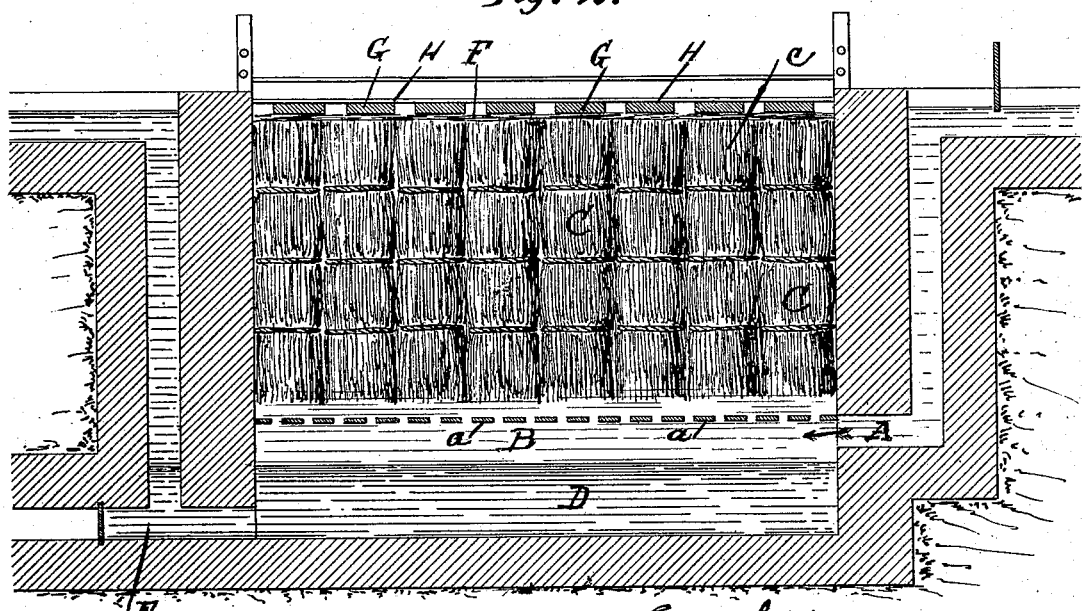

UNITED STATES PATENT OFFICE.

GEORGES LOPPENS AND HONORÉ DESWARTE, OF NIEUPORT, BELGIUM.

PROCESS OF RETTING OR STEEPING FLAX OR HEMP.

SPECIFICATION forming part of Letters Patent No. 576,867, dated February 9, 1897.

Application filed November 26, 1895. Serial No. 570,250. (No specimens.) Patented in Belgium June 4, 1895, No. 115,904.

*To all whom it may concern:*

Be it known that we, GEORGES LOPPENS and HONORÉ DESWARTE, subjects of the King of Belgium, residing at Nieuport, Belgium, have invented new and useful Improvements in Processes of Retting or Steeping Flax or Hemp, (for which we have obtained a patent in Belgium, No. 115,904, dated June 4, 1895,) of which the following is a specification.

This invention relates to the retting or steeping of flax and hemp in tanks or basins by means of running water, and has for its object to obtain a very efficient process of retting with a minimum consumption of water, and with our invention the material is treated by a special and novel process and while the flax is disposed and upheld with the stalks or stems in a vertical position, affording thereby vertical passages between them not only for the ascending of pure water, but also affording ready descent for the heavier matters and vegetable juices given off from the material.

Retted flax or hemp, in order to be of the greatest value, must have undergone to the necessary degree the special fermentation which is obtained by steeping in running water. It must also be as uniform as possible.

Regular fermentation, such as that effected by steeping in running water, is distinguished by the following characteristics: first, during the steeping, the particular odor which emanates from the flax or hemp; second, after steeping and drying, the peculiar fresh odor, the light yellow color, the fragility of the wood, and the very slight adherence of the fiber to the wood.

The uniformity of the retted material necessitates evidently the uniformity of the straw before the steeping and depends on the regularity of the fermentation caused by the steeping.

As is well known to practical men, the uniformity of retted material is of the greatest importance having regard to facility in stripping and to the value of the harl.

From thorough researches, based partly on the study of processes already known and partly on numerous experiments which we have made, we have ascertained (A) that to bring about normal fermentation by steeping in running water it is necessary that the juices extracted from the material under treatment do not remain in contact with the same and that they be replaced by fresh water in proportion as they are produced; (B) that to obtain the greatest possible regularity in the fermentation it is necessary that the water be renewed in all parts of the retting straw in the same way and with the same facility.

Our invention relates to a steeping process by which these objects are attained, together with a great saving in water; and it consists, first, in forming and maintaining directly underneath the material being steeped a layer of fresh water which supplies it with the necessary quantity of water; second, in insuring that the material under treatment is supplied with fresh water regularly, uniformly, and constantly throughout its whole mass; third, in drawing off the water containing the juices without mixing it with the fresh water.

In carrying out our invention we employ tanks or basins, each having vertical sides and provided with a false bottom with openings. The inlet and outlet pipes for the water both enter the tank between the bottom and the false bottom, the first entering at a higher level than the second.

The flax or hemp is retained in the water preferably by means of boards or cross-pieces.

In the accompanying drawings, Figure 1 is a vertical section of a tank or basin for retting or steeping flax and hemp according to our invention, and Fig. 2 a similar view with the water let into the tank.

*a* is the false bottom of the tank; A, the inlet and E the outlet for water. C C indicate the mass of the vertical bundles of flax or hemp, and G H the retaining cross-pieces for the same. B represents the upper layer, (of fresh water,) and D the lower layer, (of impure water.)

The apparatus is employed as follows: Flax or hemp is worked up into double bundles that are made of two ordinary bundles placed head to foot and having consequently a nearly cylindrical form. These bundles are arranged vertically on the false bottom *a* of the tank in such a manner that the stems are subjected to a like pressure in every part of the whole mass. The tops of the bundles are then covered with a layer of straw F, and the retaining cross-pieces G and H are arranged so as to keep the mass suitably immersed. The tank is then filled with water, and the renewal of the water is regulated in such a manner as to keep its level approximately constant.

If water at a temperature from 15° to 16° centigrade (say 60° Fahrenheit) be employed, the fermentation takes place very slowly. The duration of each of the two retting operations to which flax of good quality (*Courtrai* or *Lys* flax) should be subjected amounts to, say, fifteen, twenty, or twenty-five days, according to the nature of the stems. This temperature is rather too low. If warmer water be employed, the time required becomes gradually less, for instance, say five, four, three, or even two and a half days for water at a temperature of 25° centigrade. (Say 77° Fahrenheit.) This temperature, however, is too high in the majority of cases. It is the maximum temperature for the *Courtrai* retting, as a too rapid retting attacks the fiber and deprives it of weight, color, and quality. The most favorable temperature is about 20° centigrade. (Say 68° Fahrenheit.)

The best water for our process is rain-water. The next in order is soft water of rivers and streams and which differs but slightly from rain-water.

The fresh water flowing into the basin spreads out in a layer B under the bundles C C. From this layer slender streams of fresh water ascend on all sides into the interstices of the stems and replace therein the descending streams of juice, the said juice being heavier than water. These heavy streams slowly traverse the layer of fresh water and form in the bottom of the tank a layer D of impure water which flows away through the outlet E. It is obvious that by these arrangements the juices extracted from the material are replaced by fresh water in proportion as they are produced and that the water is renewed in all parts of the material in the same way and with the same facility. Consequently the normal fermentation of steeping in running water is effected and with the greatest possible uniformity. Independently of these two essential requirements which are satisfied by our process the latter presents other advantages. They result from the peculiar manner in which the circulation of water takes place in the mass under treatment and from the special arrangement adopted for the entrance and exit of water into and from the tank. The juice leaves the stems in the form of streams, which slowly pass through the layer of water B, so as to form the layer D. This is done quietly and without agitation of the liquid. The viscosity of these streams, the slowness of their passage through the layer B, and the absence of any rapid currents or disturbance in this layer explains why it remains very pure in spite of the passage through it of all these streams, which are more or less concentrated. The results are obtained with as great regularity as is possible in practice and with the smallest consumption of water and without using any chemical ingredient and by a natural fermentation, which is quite the same as by the retting in the *Lys*.

Among other advantages are the following:

(*a*) Owing to the extreme mildness of the water circulation between the stems and to its becoming slower when the production of juices diminishes, we prevent the fibers from being entirely deprived of their gummy substance. We obviate inconveniences suffered by the stems after the steeping process by slowly emptying the tank and allowing the stems to properly drain before removing the bundles. This is of great consequence because a certain part of the gummy substances ought to remain incorporated with the fiber to prevent the same from disaggregating. This separation of the gummy substances at the end of the steeping process is caused either by friction or by the action of a too energetic circulation of water on the gummy substance, which is then reduced to a mucilaginous state and easily becomes loosened from the fiber.

(*b*) When the water is renewed too abundantly in the tank, the level of the lower layer of impure water will sink until the outlet ceases to be covered by this layer, in which case a certain quantity of fresh water will flow directly through the lower part of the tank without circulating in the mass under treatment. The latter will continue to suck up the quantity of fresh water necessary to replace the juices extracted from the stems. Consequently not only will an excess of water-renewing not be prejudicial to the flax or hemp, but such excess can be at once detected by the purity of the water which flows out, and can therefore be remedied.

(*c*) When the water does not flow quickly enough into the tank, the diminution in the circulation will be first observable in the layer of impure water in the form of abnormal fermentations (putrid acid or butyric) before any effect is produced in the mass where the the water is always purer. The attendant will then be advised by the odor of the water flowing from the outlet and will easily increase the supply of water before any injurious effects have been produced.

(*d*) Lastly, on account of the low velocity of the flow below the bundles and also in the interstices in the same and on account of the superposition of the layers of fresh and impure water, the said fresh and impure water will only mix to a slight extent and the heavy juice will be hardly diluted before it is drawn off through the outlet. Except in the case in which the fresh water flows too rapidly into the tank, which it is easy to obviate, our process is attended with a minimum consumption of water, as the latter only leaves the tanks when saturated with the juice extracted from the stems of the flax or hemp under treatment.

Having now particularly described and ascertained the nature of our said invention and in what manner the same is to be performed, we declare that what we claim is—

5. The herein-described process of retting flax which consists in covering a mass of vertically-arranged flax-straw with water, constantly delivering fresh water beneath the mass, and constantly withdrawing the same quantity of impure water from below the fresh water, substantially as described.

GEORGES LOPPENS.
HONORÉ DESWARTE.

Witnesses:
GEORGE BEELE,
GREGORY PHELAN.